United States Patent
Dillman

(10) Patent No.: US 7,497,176 B2
(45) Date of Patent: *Mar. 3, 2009

(54) ACTUATING DEVICE FOR A DRIVE ARRANGEMENT

(75) Inventor: Jeff Dillman, Ames, IA (US)

(73) Assignee: Tru Count, Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/969,953

(22) Filed: Jan. 7, 2008

(65) Prior Publication Data

US 2008/0156239 A1 Jul. 3, 2008

Related U.S. Application Data

(63) Continuation of application No. 11/617,973, filed on Dec. 29, 2006, now Pat. No. 7,374,029.

(51) Int. Cl.
*F16D 11/00* (2006.01)
*F16D 13/52* (2006.01)
*F16D 23/00* (2006.01)

(52) U.S. Cl. .............. 111/200; 111/921; 192/30 R; 192/70.1

(58) Field of Classification Search ............. 192/70.19, 192/70.16, 70.11, 66.1, 30 R; 111/170–185, 111/200, 921
See application file for complete search history.

(56) References Cited

U.S. PATENT DOCUMENTS

| 4,744,447 | A | 5/1988 | Kato et al. |
|---|---|---|---|
| 4,779,471 | A | 10/1988 | Rettig |
| 5,967,066 | A | 10/1999 | Giles et al. |
| 6,516,733 | B1 | 2/2003 | Sauder et al. |
| 6,526,339 | B1 | 2/2003 | Herzog et al. |
| 6,729,250 | B2 | 5/2004 | Friestad et al. |
| 6,745,710 | B2 | 6/2004 | Friestad et al. |
| 7,140,310 | B2 | 11/2006 | Mayerle et al. |
| 7,395,769 | B2 | 7/2008 | Jensen |
| 2004/0025765 | A1 | 2/2004 | Friestad et al. |
| 2004/0189740 | A1 | 9/2004 | Yoshida |

OTHER PUBLICATIONS

Layton W. Jensen; Individual Row Shut-Down Control Of Farm Implements To Eliminate Overlap In Irregularly Shaped Areas Of Application; filed Oct. 21, 2004, U.S. Appl. No. 10/970,053; United States Patent and Trademark Office.

*Primary Examiner*—Christopher J. Novosad

(57) ABSTRACT

An actuating device for a drive arrangement having a drive transmission operatively connected to a metering structure where a clutch is mounted adjacent to drive transmission, an actuating device is positioned to selectively engage the clutch such that the rotational force transferred from the drive transmission to the metering structure is selectively deactivated when the actuating member engages the clutch.

11 Claims, 4 Drawing Sheets

ACTUATING DEVICE FOR A DRIVE ARRANGEMENT

This application is a continuation of application Ser. No. 11/617,973 filed Dec. 29, 2006.

BACKGROUND OF THE INVENTION

This invention is directed toward an actuating device and more particularly an actuating device for a drive arrangement of an implement.

Equipment for planting crops such as corn, soybeans, cotton, peanuts, wheat and the like is well known in the art. Typically, a planter will consist of a central beam known as a toolbar. Attached to the tool bar are individual planting units commonly referred to as row units. Each row unit will plant one row and planters come in different sizes having any number of rows. The toolbar will have a row unit for each row that is planted. For example, a twelve row planter will have one toolbar with 12 individual row units attached thereto.

To deposit seed on the ground a row unit requires rotational force. The rotational force typically is provided by a central drive shaft that is approximately the same length as the toolbar. The central drive shaft is attached to a drive mechanism that rotates the central drive shaft. There are several different drive arrangements known in the art for rotating the row unit including a chain drive comprising of roller chain sprockets on both the row unit and the central drive shaft and a roller chain connecting the two. Another way includes a flexible drive shaft connected to a drive gear and a drive transmission that rotates a metering structure. An example of the second drive arrangement is outlined in U.S. Pat. No. 4,779,471 by Rettig incorporated by reference herein in its entirety.

While these known arrangements provide rotational force to the row unit, they do not permit a farmer to plant some rows and not others as selected. Because all row units are driven by a central drive shaft as mentioned above, it is not possible to selectively deactivate some rows while allowing others to operate. Therefore, there exists a need in the art for an actuating device that addresses these deficiencies.

An object of the present invention is to provide an actuating device that selectively deactivates a row unit.

Another object of the present invention is to provide an actuating device that selectively deactivates a row unit based upon the geographic location of a planter as determined by a GPS system.

A still further object of the present invention is to provide an actuating device that requires a small amount of current.

These and other objectives, features and advantages will be apparent to one skilled in the art based upon the following disclosure.

SUMMARY OF THE INVENTION

An actuating system for a drive arrangement where the drive arrangement includes an implement shaft connected to a drive gear, a drive shaft connected to the drive gear, a drive transmission connected to the drive shaft, and a metering structure connected to the drive transmission. The drive transmission is connected to the metering structure by a transmission drive shaft that is connected to a seed shaft. Fitted over the transmission drive shaft and the seed shaft is a hollow tube that rotationally engages a rotational bore within the drive transmission. A clutch is positioned such that a driver member rotationally engages the hollow tube and the driven member rotationally engages the transmission drive shaft. A release ring fits around the driver member and the driven member. An actuating member is positioned to engage the release ring.

In an alternative embodiment, a clutch is mounted to the implement shaft such that the driver member rotationally engages the implement shaft. The driven member rotationally engages a center member that rotationally engages a rotational bore within the drive gear. A release ring fits around the driver member and the driven member and an actuating member is positioned to engage the release ring.

DETAILED DESCRIPTION OF THE PREFERRED EMBODIMENTS

Figure 1:
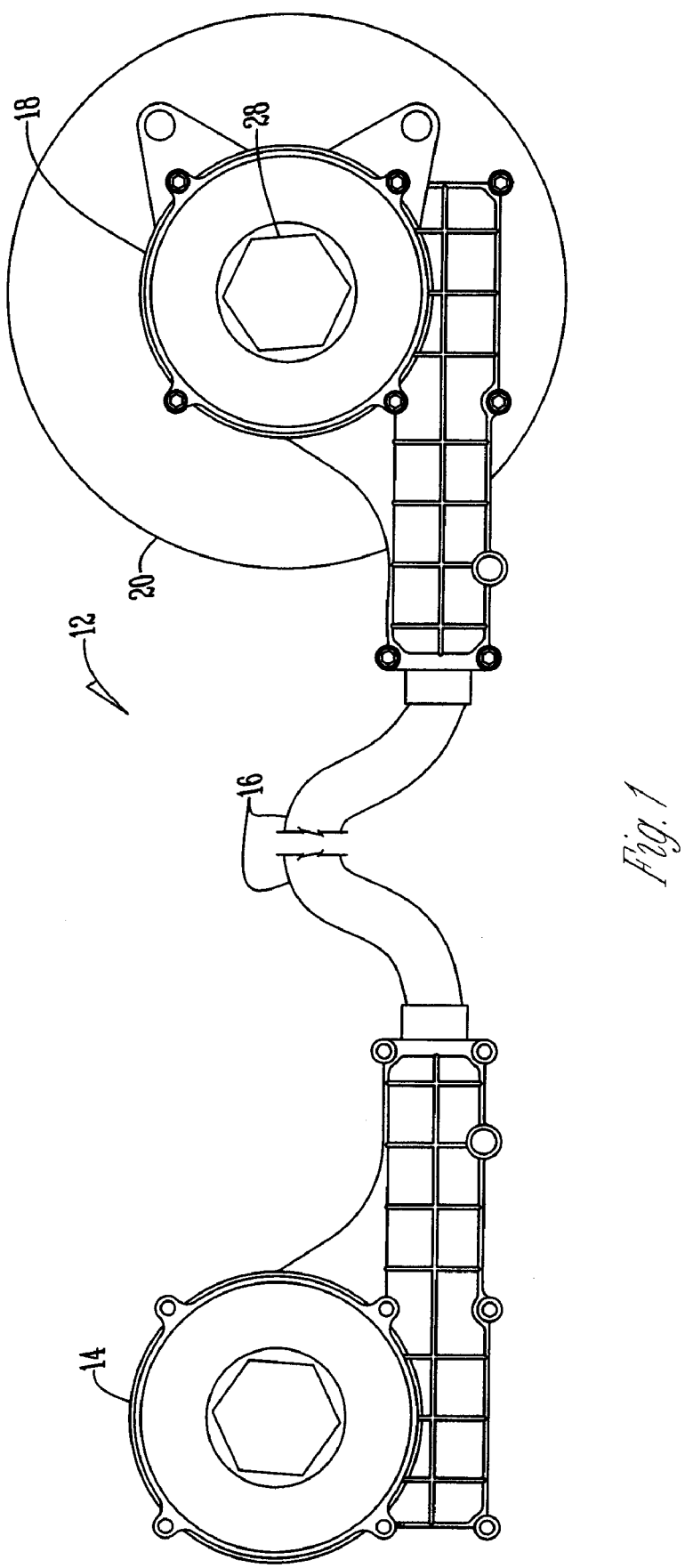
FIG. 1 is a side view of a drive arrangement.
Figure 2:
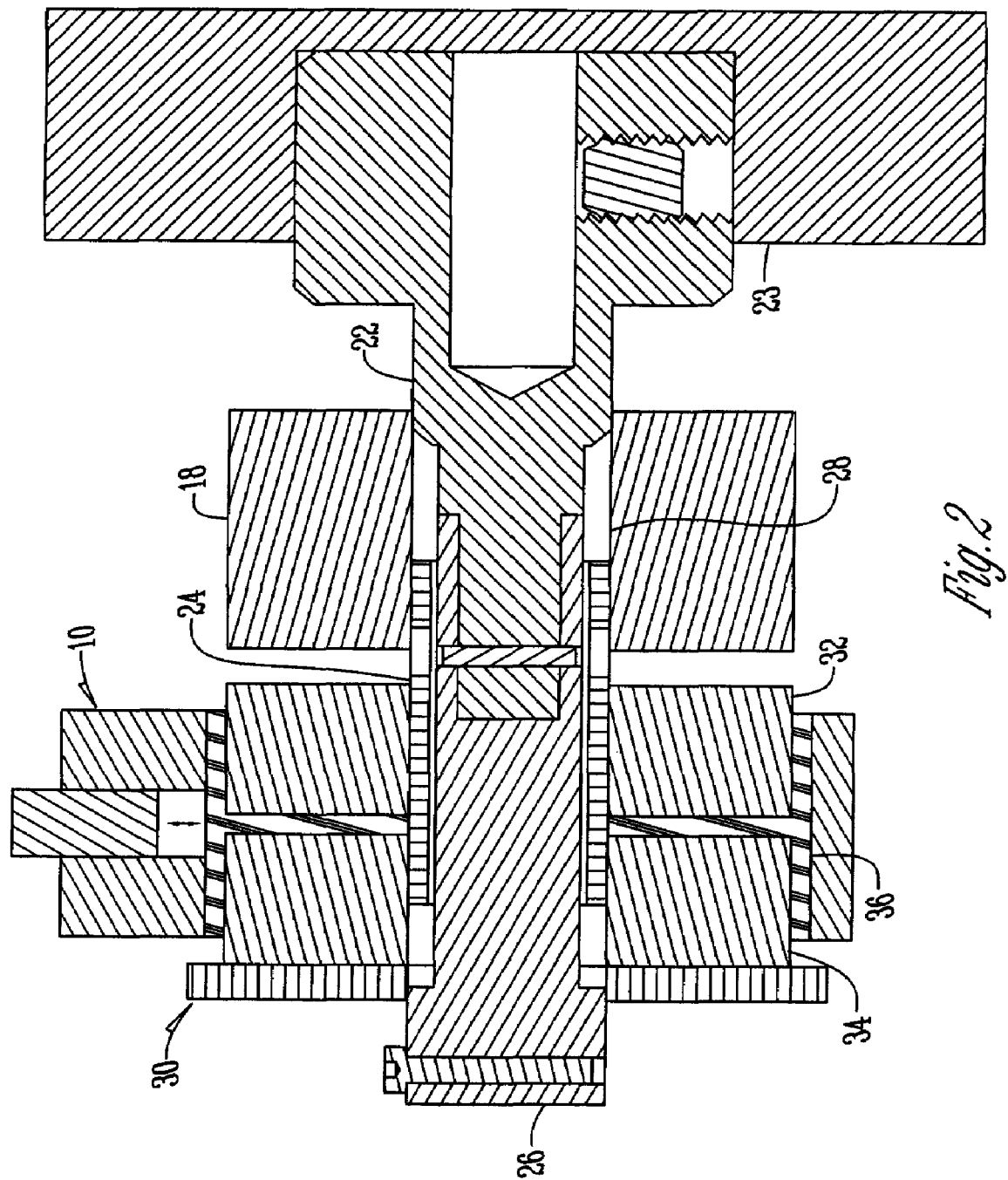
FIG. 2 is a sectional view of an actuating system.
Figure 3:
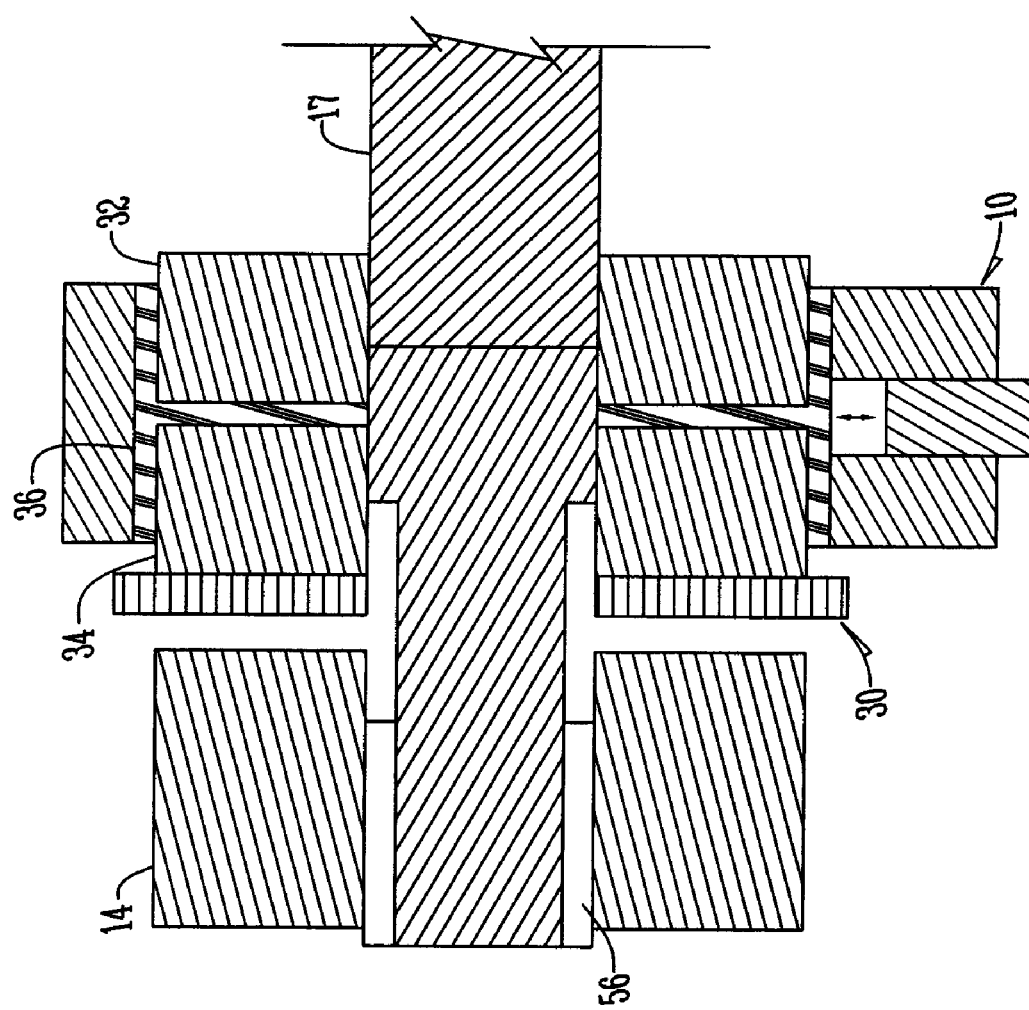
FIG. 3 is a sectional view of an alternative actuating system.
Figure 4:
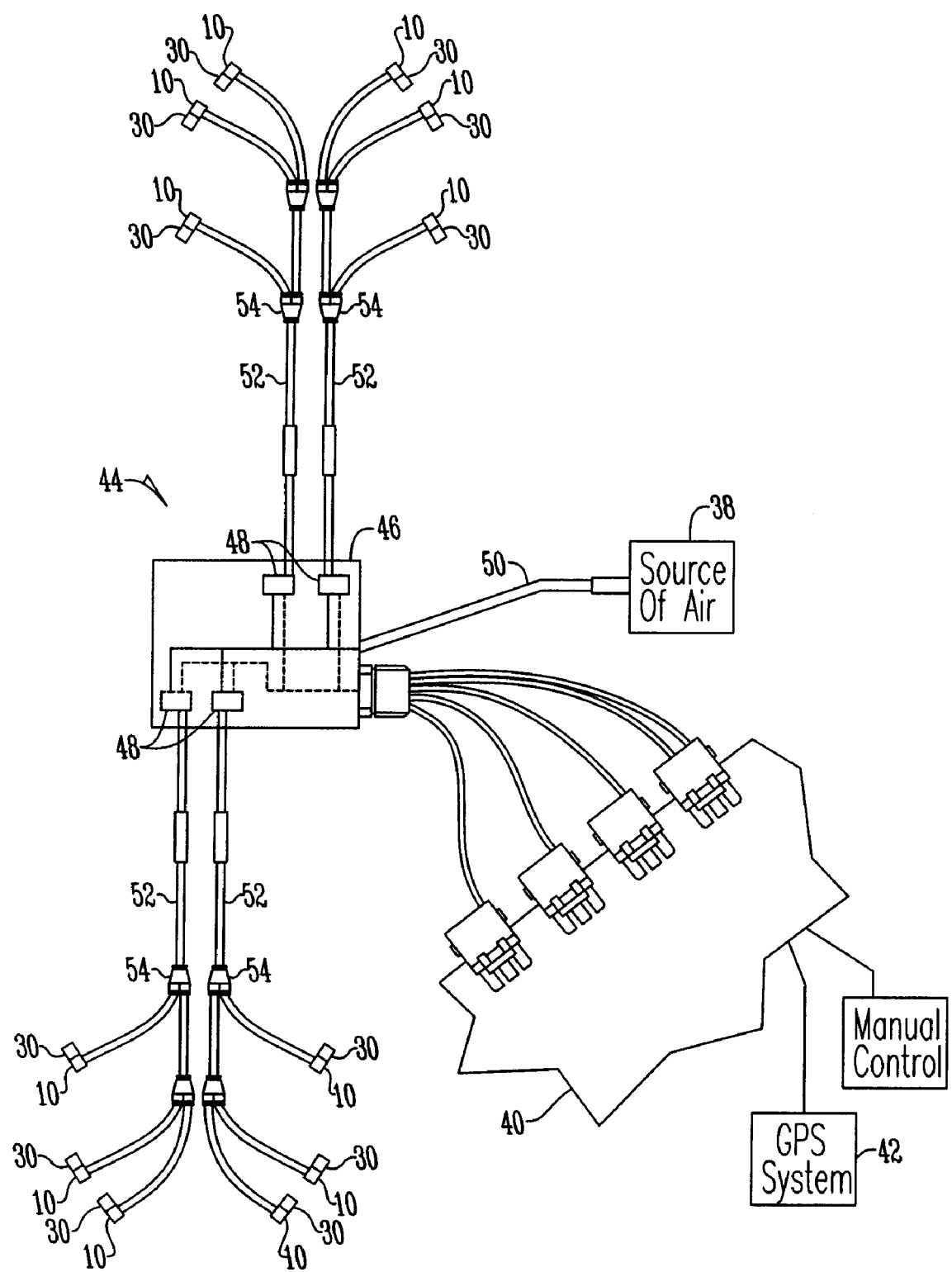
FIG. 4 is a schematic view of an actuating system.

Referring to the Figures, the actuating device 10 is used in conjunction with a drive arrangement 12. While the actuating device 10 may be adapted for use with many types of drive arrangements without departing from the scope or spirit of the invention, the following drive arrangement 12 is depicted by way of example only. The drive arrangement 12 includes a drive gear 14 that is operatively connected to a drive shaft 16. Preferably the drive shaft 16 is flexible. The drive gear arrangement 14 is fixed to an implement shaft 17 (axle or engine) that provides rotational force to the drive gear arrangement 14. Connected to the opposite end of the drive shaft 16 is a drive transmission 18. The drive transmission 18 is operatively connected to a metering structure 20 such as a row unit which deposits seed on to the ground. Drive is therefore provided from the axle or engine shaft 17 through the drive gear arrangement 14, drive shaft 16 and drive transmission 18 to drive the metering structure 20 at a speed proportional to the ground speed of the implement.

The connection between the drive transmission 18 and the metering structure 20 includes a seed shaft 22 that is connected to a metering drive 23. Placed over the seed shaft 22 is a hollow tube 24. The hollow tube 24 is not attached to the seed shaft 22 and rather spins freely about the seed shaft 22. Placed inside the hollow tube 24 and attached to the seed shaft 22 is a transmission drive shaft 26. In this manner, the transmission drive shaft 26 and the seed shaft 22 rotate in unison and the hollow tube 24 is free to rotate about both shafts 22 and 26. The hollow tube is of any shape and is formed to fit within the bore 28 of the drive transmission 18 such that when drive shaft 16 is rotated the rotational force transfers to drive transmission 18 which causes the drive transmission 18 and the hollow tube 24 to rotate in unison. Preferably the hollow tube 24 and bore 28 are hex shaped.

Placed over the transmission drive shaft 26 and at least a portion of hollow tube 24 is a clutch 30. Any type of clutch 30 may be used. One example is a clutch 30 having a driver member 32 that fits over at least a portion of the hollow tube 24 and a driven member 34 that fits over and is securely attached to the transmission drive shaft 26. The driver member 32 and driven member 34 are adjacent to one another and are partially received by a torsion spring (not shown) which in a natural state is compressed against members 32 and 34 such that they rotate together. Surrounding the torsion spring is a release ring 36. In this natural or deactived state, rotational force is transferred from the drive transmission 18 to the hollow tube 24 and then to the driver member 32. The torsion spring connects the driver member 32 and driven member 34 such that they rotate together which transfers rotational force to the transmission drive shaft 26, then to the seed shaft 22 which in turn rotates the metering drive 23 of the metering structure 22.

Positioned to selectively engage the release ring 36 is the actuating member 10. The actuating member 10 is of any type, size, shape, or structure that permits engagement of the release ring 36. Preferably, the actuating device 10 is pneumatic and is connected to a source of compressed air 38. The source of compressed air is of any type including a 12V portable compressor mounted to an implement or a rechargeable portable tank without a compressor. The source of compressed air 38 may be electrically connected to a controller 40 that sends a signal to activate the source of compressed air 38 which in turn activates the pneumatic actuating device 10. The controller 40 may be wirelessly connected to a GPS system 42 to permit activation based on geographic location.

When activated compressed air is supplied to the actuating member 10 such that the actuating member 10 engages the release ring 36. When engaged, the release ring 36 releases the compression of the torsion spring (not shown), thus releasing the driver member 32 from the driven member 34. When this occurs rotational force is transferred from the drive transmission 18 to the hollow tube 24, and then to the driver member 32. The hollow tube 24 spins freely about seed shaft 22 and transmission drive shaft 26, while the driver member rotates independently of the driven member 34 and no rotational force is transferred to the driven member 34. As such, no rotational force is transferred to the transmission drive shaft 26, the seed shaft 22, or the metering drive 23. Thus, by activating the actuating member 10, rotation of the metering structure 20 is selectively stopped.

In order to selectively and independently activate a plurality of actuating members 10 a valve module 44 is used. The valve module 44 is electrically connected to the controller 40 for either manual activation or activation through a conventional GPS system. The valve module 44 includes a housing 46 that contains a plurality of valves 48. The valves 48 are connected, through the housing 46 to the source of compressed air 38 through tube 50. Also connected to each valve 48 at one end is an air tube 52 that is connected to the pneumatic actuating device 10 at the opposite end of the air tube 52. Multiple actuating members 10 may be connected to each air tube 52 through the use of at least one or more connectors 54 such as a Y or T connector. This connection system is known as "daisy chaining" and allows one to easily connect and disconnect actuating members 10 from the valves 48 based on the desired application. In this manner a group of actuating members 10 are activated when a selected valve 48 is activated by the controller 40.

This system is particularly valuable in a planting device. For example, a twelve row planter using a valve module 44 having four valves 48 may be set to control four sections of three rows each. Should greater control be desired, a second valve module 44 may be added having two valves 48 so that the modules 44 may be set to control six sections of two rows each.

In operation the controller 40 transmits a signal to activate the source of compressed air 38 and also selectively activates valves 48 based either on a manual command or a geographic location as determined by the GPS system 42. Once activated, valve 48 permits compressed air to travel through tube 52 to the actuating member 10 to activate the actuating member 10.

In an alternative embodiment the clutch 30 and actuating member 10 are positioned adjacent the drive gear arrangement 14. Engine shaft 17 is operably connected to driver member 32 of the clutch 30. The driven member 34 is operably connected to a center member 56 of the drive gear arrangement 14. The center member 56 has a bore larger than the diameter of engine shaft 17 such that the engine shaft 17 does not drive the center member 56. The center member 56 is attached to drive shaft 16 such that rotational force from engine shaft 17 is transferred to the center member 56 and through driven member 34 to drive shaft 16. As previously described, actuating devices 10 are positioned to selectively engage the release ring 36 of each clutch 30. When the actuating member 10 in not activated, the torsion spring (not shown) is compressed such that the driver member 32 and the driven member 34 rotate together. When the actuating member 10 is activated the release ring 36 engages the torsion spring to release the compression on the driver member 32 and the driven member 34. When this occurs, the engine shaft 17 will transfer rotational force to the driver member 32, but no rotational force will be transferred to 34, the center member 56, drive shaft 16, drive transmission 18 or the metering structure 20.

The invention claimed is:

1. An actuating system for a planter, comprising:
   a drive arrangement including a drive gear operatively connected to a drive shaft that is operatively connected to a drive transmission;
   a transmission drive shaft connected to a seed shaft that is operatively connected to a metering structure;
   a hollow tube that fits over the transmission drive shaft and the seed shaft and is formed to rotationally engage a rotating bore in the drive transmission;
   a clutch having a driver member and a driven member positioned within a release ring such that the driver member rotationally engages the hollow tube and the driven member rotationally engages the transmission drive shaft; and
   an actuating device positioned to engage the release ring.

2. The system of claim 1 wherein the actuating member is connected to a controller and the controller activates the actuating member based on a geographic location determined by a GPS system.

3. The system of claim 2 wherein the actuating member is connected to a source of compressed air through a valve.

4. The system of claim 3 wherein the source of compressed air is connected to a controller that activates the source of compressed air.

5. The system of claim 4 wherein the controller activates the source of compressed air based on a manual command.

6. The system of claim 4 wherein the controller activates the source of compressed air based on a geographic location determined by a GPS system.

7. The system of claim 3 wherein more than one actuating member is positioned to engage more than one clutch, the actuating members connected to a valve module having more than one valve.

8. The system of claim 7 wherein a controller is connected to a source of compressed air and the valve module to activate the valves and the source of compressed air.

9. The system of claim 8 wherein the valves are connected to more than one actuating member.

10. The system of claim 9 wherein the controller activates the compressed air and the valves based on a manual command.

11. The system of claim 9 where the controller activates the compressed air and the valves based on a geographic location determined by a GPS system.

* * * * *